B. TABKINS.
NUT LOCK.
APPLICATION FILED SEPT. 22, 1914.
1,146,667.
Patented July 13, 1915.
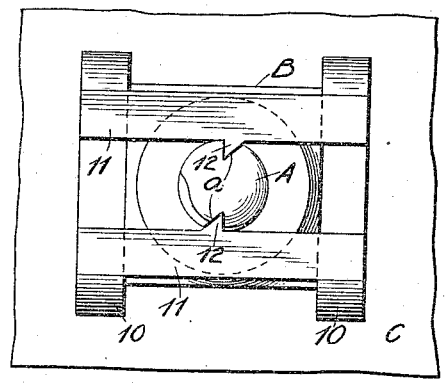
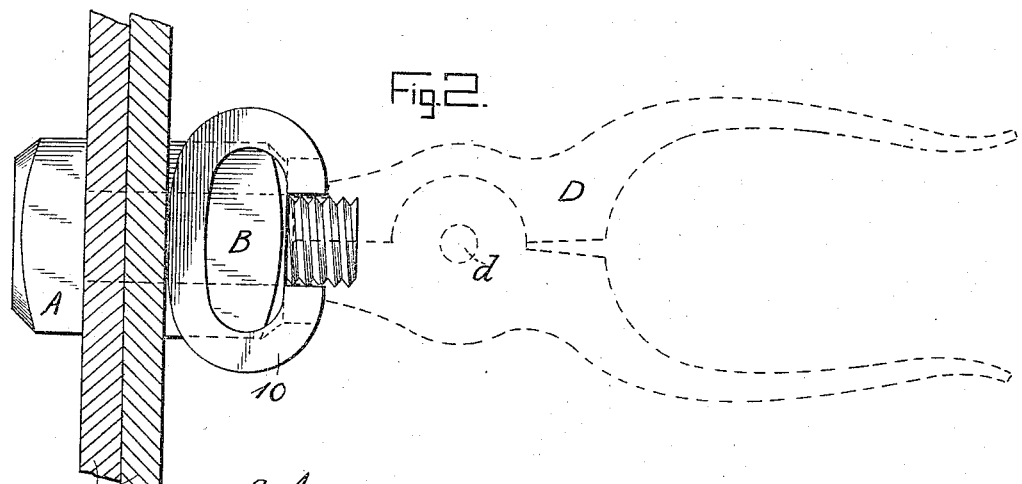
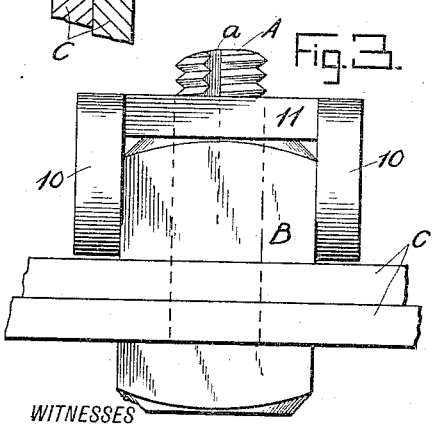
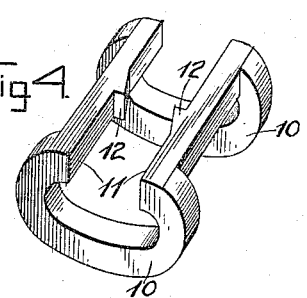
WITNESSES
INVENTOR
Bill Tabkins
BY
ATTORNEYS

UNITED STATES PATENT OFFICE.

BILL TABKINS, OF MOORINGSPORT, LOUISIANA.

NUT-LOCK.

1,146,667.  Specification of Letters Patent.  Patented July 13, 1915.

Application filed September 22, 1914.  Serial No. 862,874.

*To all whom it may concern:*

Be it known that I, BILL TABKINS, of Mooringsport, Caddo parish, State of Louisiana, have invented a new and Improved Nut-Lock, of which the following is a full, clear, and exact description.

My invention relates particularly to a device to lock a nut on a longitudinally grooved bolt.

The prime object of the invention is to provide a device for the indicated purpose, of simple, strong and cheap construction, which can be readily applied in a way to hold the nut securely against turning on the bolt, while adapted to be removed with facility when desired.

The invention will be particularly explained in the specific description following.

Figure 1 is a front view of my improved nut lock, showing the same applied. Fig. 2 is a side elevation of the device applied. Fig. 3 is a plan view of the device applied, and Fig. 4 is a separate perspective view of the nut lock.

My improved device is formed to secure the nut B of usual form on a bolt A. It is to be understood that the bolt and nut may be employed to clamp any two or more members C together, said members being conventionally illustrated.

My improved nut lock comprises two end members 10 spaced apart to receive a nut between them, and embrace the same at opposite sides. The members are joined by longitudinal bars 11 parallel, or approximately so, with each other. The bars 11 are integral with the end members 10, and join one end of one member with the corresponding end of the other member. The longitudinal bars 11 are spaced apart a distance slightly less than sufficient to receive between them transversely the bolt A. It will be noted that the end members have a drop between their ends, and preferably they are in bowed form. On the inner face of each bar 11 I provide a tooth 12, the said teeth preferably being directly opposite each other. Desirably, the teeth 12 are of the general form of ratchet teeth, thereby presenting each a front surface perpendicular to the inner face of the adjacent longitudinal bar 11, and an inclined back surface.

In practice, after the nut B has been screwed up tightly, the nut lock is so positioned that the end members 10 will lie at opposite sides of the nut, and the bars 11 adjacent to the outer end of the bolt. The teeth 12 will thus overlap the front end of the bolt, and a blow from a hammer or like tool delivered against the bars 11, will cause the teeth 12 to cut grooves *a* longitudinally of the bolt.

The end members 10 are more or less resilient, and if it is desired to remove the nut lock, a tool D of the general character of nippers is employed. The nose of the tool is entered between the bars 11, and the latter separated to relieve the gripping action of the teeth 12 in the grooves *a*.

Having thus described my invention, what I claim as new, and desire to secure by Letters Patent, is:

1. A nut lock to engage a bolt and a nut thereon, said lock comprising bowed resilient end members, approximately parallel spaced bars integral with said end members, each connecting one end of one member with the corresponding end of the other member, said bowed end members presenting a drop between the ends thereof, and a tooth on the inner face of each bar, the teeth being disposed oppositely to each other and each presenting an inclined face, and a face approximately at right angles to the inner face of the adjacent bar.

2. A nut lock of the character described comprising longitudinal bars spaced to receive a bolt, transverse end members uniting adjacent ends of the respective bars, the said end members having each a drop between the bars and adapted to embrace opposite sides of a nut, and a lateral tooth on the inner face of one of the bars, the tooth projecting toward the opposite bar.

In testimony whereof I have signed my name to this specification in the presence of two subscribing witnesses.

BILL TABKINS.

Witnesses:
R. C. RUMBAUGH,
J. J. PRICE, Jr.

Copies of this patent may be obtained for five cents each, by addressing the "Commissioner of Patents, Washington, D. C."